(12) United States Patent
Albert et al.

(10) Patent No.: US 12,296,956 B2
(45) Date of Patent: May 13, 2025

(54) METHOD FOR MANUFACTURING AN AERODYNAMIC AIRCRAFT STRUCTURE AND AERODYNAMIC AIRCRAFT STRUCTURE THUS OBTAINED

(71) Applicant: Airbus Operations SAS, Toulouse (FR)

(72) Inventors: Brice Albert, Toulouse (FR); Benjamin Trarieux, Toulouse (FR); Harleen Kaur, Toulouse (FR); Stéphane Daure, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 253 days.

(21) Appl. No.: 17/799,954

(22) PCT Filed: Feb. 16, 2021

(86) PCT No.: PCT/EP2021/053786
§ 371 (c)(1),
(2) Date: Aug. 16, 2022

(87) PCT Pub. No.: WO2021/165268
PCT Pub. Date: Aug. 26, 2021

(65) Prior Publication Data
US 2023/0062638 A1 Mar. 2, 2023

(30) Foreign Application Priority Data
Feb. 18, 2020 (FR) ...................................... 2001597

(51) Int. Cl.
*B64C 9/32* (2006.01)
*B64F 5/10* (2017.01)

(52) U.S. Cl.
CPC . *B64C 9/32* (2013.01); *B64F 5/10* (2017.01)

(58) Field of Classification Search
None
See application file for complete search history.

(56) References Cited

U.S. PATENT DOCUMENTS

| | | |
|---|---|---|
| 2010/0320331 A1 | 12/2010 | Vallee |
| 2016/0362172 A1 | 12/2016 | Axford |
| 2017/0233061 A1 | 8/2017 | Seis et al. |
| 2018/0099736 A1 | 4/2018 | Kordel et al. |

FOREIGN PATENT DOCUMENTS

| | | |
|---|---|---|
| EP | 2862798 A2 | 4/2015 |
| EP | 3309059 A1 | 4/2018 |
| FR | 2927686 A1 | 8/2009 |
| WO | 2018211232 A1 | 11/2018 |

OTHER PUBLICATIONS

International Search Report; priority document.

*Primary Examiner* — Jacob T Minskey
*Assistant Examiner* — Adrien J Bernard
(74) *Attorney, Agent, or Firm* — Greer, Burns & Crain, Ltd.

(57) ABSTRACT

A method for manufacturing an aerodynamic structure including a first panel having an aerodynamic face, as well as a second reinforced panel. The method includes a step of stamping the second panel to obtain at least one raised shape which is recessed on the second face, and a step of joining the first and second panels by pressing them against each other outside the at least one raised shape. An aerodynamic shape is obtained using this method.

18 Claims, 9 Drawing Sheets

METHOD FOR MANUFACTURING AN AERODYNAMIC AIRCRAFT STRUCTURE AND AERODYNAMIC AIRCRAFT STRUCTURE THUS OBTAINED

CROSS-REFERENCES TO RELATED APPLICATIONS

This application claims the benefit of the International Application No. PCT/EP2021/053786, filed on Feb. 16, 2021, and of the French patent application No. 2001597 filed on Feb. 18, 2020, the entire disclosures of which are incorporated herein by way of reference.

FIELD OF THE INVENTION

The present application relates to a method for manufacturing a movable or fixed aerodynamic aircraft structure, and to a movable or fixed aerodynamic aircraft structure thus obtained.

BACKGROUND OF THE INVENTION

According to an embodiment known from document EP2862798, which can be seen in FIGS. 2 and 3, a movable aerodynamic structure 10, such as an air brake for example, comprises a first and a second panel 12, 14 that are connected by a plurality of ribs 16 in order to form a box-type structure. The movable aerodynamic structure 10 comprises multiple connecting elements 18 forming part of an articulation and also a connecting element 20 configured to connect an actuator to the movable aerodynamic structure 10. The ribs 16 are arranged so as to ensure optimum transmission of forces between the connecting elements 18, 20 and the first or the second panel 12, 14, which are in contact with an aerodynamic flow during operation.

In a first manufacturing method, the first and the second panel 12, 14 and the ribs 16 are made independently of one another and then assembled. This first production method is not satisfactory because it requires management of a large number of parts, this tending to increase the manufacturing time and costs.

In a second manufacturing process, the first panel 12 and the ribs 16 are made in one piece from a block of material machined so as to produce the cells between the ribs 16. This second manufacturing method is not satisfactory because it generates a lot of waste. In addition, it results in significant manufacturing costs and time for each structure.

In another drawback, the movable aerodynamic structure obtained from the first and second manufacturing methods of the prior art has a relatively large mass.

The present invention seeks to remedy all or some of the drawbacks of the prior art.

SUMMARY OF THE INVENTION

To this end, the invention relates to a method for manufacturing an aerodynamic structure having a first panel with a first and a second face, the first face forming an aerodynamic face, and also a reinforced second panel with a first and a second face, the second face of the second panel being oriented toward the second face of the first panel. According to the invention, the manufacturing method comprises a step of shaping the second panel, during which the second panel is stamped to obtain at least one relief shape, which is recessed on the second face, and also a step of joining the first and the second panel by pressing their second faces against one another away from the relief shape(s).

The method of the invention makes it possible to obtain an aerodynamic structure from a limited number of parts, this tending to reduce the manufacturing time and costs. In addition, the creation of ribs on the second panel by stamping makes it possible to reduce the mass of the aerodynamic structure compared to the prior art with the same mechanical properties.

According to other features, taken individually or in combination:

a. before the joining step, the method comprises a step of inserting an intermediate panel between the first and the second panel, the intermediate panel comprising a first and a second face, the first face being oriented toward the second face of the first panel and the second face being oriented toward the second face of the second panel. The insertion of an intermediate panel makes it possible to have a generic second panel for various aerodynamic structures, whereas the first panel is specific to an aerodynamic structure;

b. during the joining step, the second face of the second panel and the second face of the intermediate panel are pressed against one another away from the relief shape (s), and the second face of the first panel and the first face of the intermediate panel are pressed against one another;

c. during the joining step, the first and the second panel are connected by welding;

d. the manufacturing method comprises, before the step of shaping the second panel, a step of shaping the first and the second panel in the same way depending on a desired aerodynamic profile;

e. after the step of shaping the second panel, the manufacturing method comprises a step of fixing at least one connecting element on the second panel at the relief shape. The aerodynamic structure thus obtained is consequently a movable aerodynamic structure.

The invention also relates to an aerodynamic structure having a first panel with a first and a second face, the first face forming an aerodynamic face, and also a reinforced second panel with a first and a second face, the second face of the second panel being oriented toward the second face of the first panel, the second panel comprising at least one relief shape, which is recessed on the second face, the second faces of the first and the second panel being connected to one another away from the relief shape(s). According to the invention, the aerodynamic structure also comprises an intermediate panel arranged between the first and the second panel.

The presence of an intermediate panel between the first and the second panel makes it possible to have a generic second panel for various aerodynamic structures, whereas the first panel and the intermediate panel are specific to an aerodynamic structure.

According to another feature, the aerodynamic structure comprises a first and a second longitudinal edge, a first and a second lateral edge and at least one main or secondary connecting element positioned close to the first longitudinal edge. In addition, the relief shape comprises at least one main cavity to which is connected at least one of the main and the secondary connecting element. This aerodynamic structure is consequently a movable aerodynamic structure.

According to another feature, the main cavity extends parallel to the first longitudinal edge, over a length that is greater than or equal to at least one third of a distance between the first and the second lateral edge.

According to another feature, the main cavity has a maximum depth in line with a main connecting element, this depth decreasing with decreasing distance away from the first and the second lateral edge.

According to another feature, the relief shape comprises at least one arm which extends in the direction of at least one of the first and the second longitudinal edge and the first and the second lateral edge, from a first end connected to the main cavity as far as a second end.

According to another feature, the intermediate panel comprises at least one arm with a shape substantially identical to a shape of the arm of the relief shape or to a peripheral shape of part of the cavity.

According to another feature, the second end of each arm of the relief shape is remote from the first and the second longitudinal edge and the first and the second lateral edge.

According to another feature, each arm of the relief shape comprises a cross section which decreases between the first end and the second end.

According to another feature, each connecting element comprises at least one plate having an edge face which closely follows the shape of the second panel in line with a main cavity.

According to another feature, the edge face is connected to the second panel away from the relief shape and also to a bottom and a lateral wall of the main cavity.

According to another feature, the main cavity or at least one arm of the relief shape has a reinforcing rib.

According to another feature, the aerodynamic structure has at least one plate arranged between the main or secondary connecting element and the first panel. More specifically, according to one feature, the aerodynamic structure has at least one plate arranged between the main or secondary connecting element and the second panel. According to another feature, the aerodynamic structure has at least one plate arranged between the second panel and the first panel. According to another feature, the aerodynamic structure has at least one plate arranged between the second panel and the intermediate panel.

According to another feature, the second face of the first panel has a region of increased thickness, and the second face of the second panel is conformed to said the region of increased thickness. This region of increased thickness of the first panel makes it possible to incorporate an aerodynamic function on the second face of the second panel.

The invention also relates to an aircraft having at least one aerodynamic unit according to one of the above features.

BRIEF DESCRIPTION OF THE DRAWINGS

Other features and advantages will become apparent from the following description of the invention, which description is given solely by way of example, with reference to the appended drawings in which.

DETAILED DESCRIPTION OF THE PREFERRED EMBODIMENTS

Figure 1:
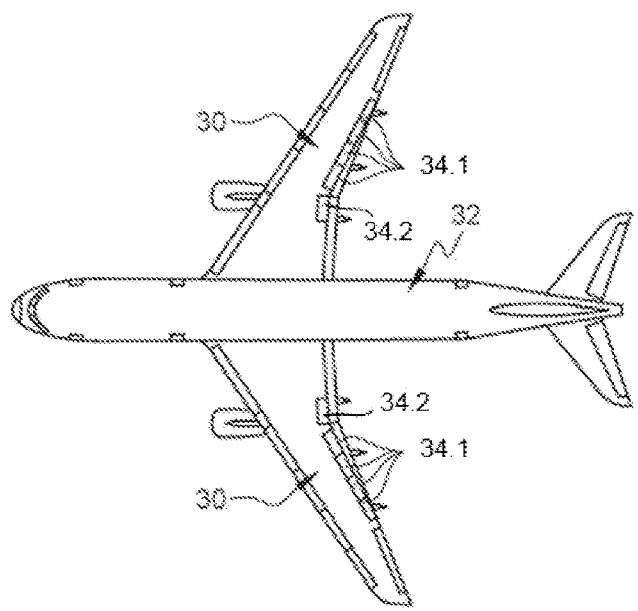
FIG. 1 is a top view of an aircraft.
Figure 2:
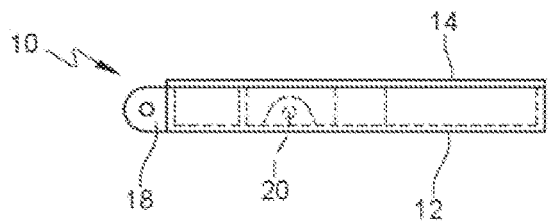
FIG. 2 is a side view of a movable aerodynamic structure illustrating an embodiment of the prior art.
Figure 3:
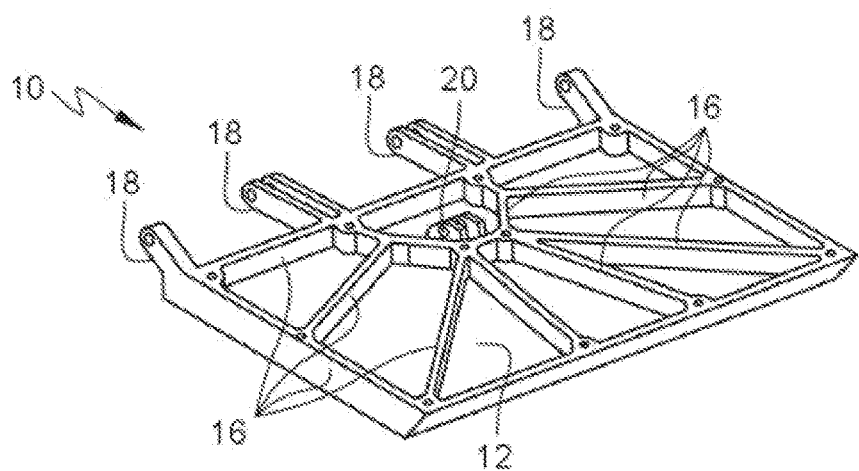
FIG. 3 is a perspective view of a first part of the movable aerodynamic structure that can be seen in FIG. 2.

According to an embodiment that can be seen in FIG. 1, an aircraft comprises two wings 30 that are disposed on either side of the fuselage 32 and each of which is equipped with five movable flaps 34.1, 34.2, referred to as air brakes.

Of course, the invention is not limited to air brakes. More broadly, the invention relates to all movable aerodynamic structures 34 with at least one aerodynamic face F34 in contact with a flow of air circulating around the aircraft when the latter is moving. For example, the movable aerodynamic structure is an aircraft hatch.

The invention likewise relates to all fixed aerodynamic structures with at least one aerodynamic face in contact with a flow of air circulating around the aircraft when the latter is moving.

In the remainder of the description, the invention is mainly described for a movable aerodynamic structure 34. The features of the movable aerodynamic structure 34 described also apply to a fixed aerodynamic structure.

Figure 4:
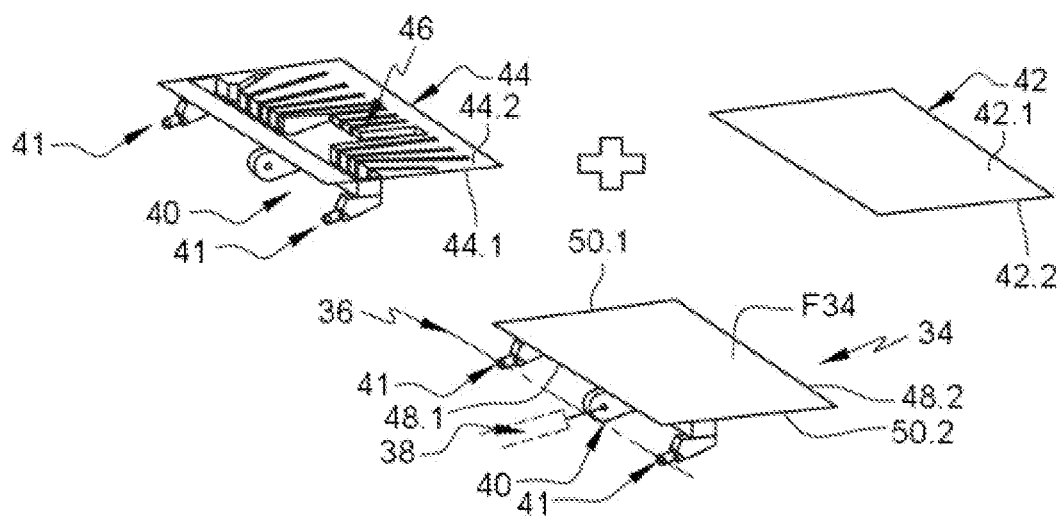
FIG. 4 is a diagram of the various parts of a movable aerodynamic structure before and after an assembly step illustrating one embodiment of the invention.

During operation, each movable aerodynamic structure 34 is connected by at least one articulation 36 (symbolized by an axis in FIG. 4) to the rest of the aircraft and its position is controlled by at least one actuator 38 (shown schematically in FIG. 4). To that end, the movable aerodynamic structure 34 comprises at least one main connecting element 40 to which is connected the actuator 38 and/or at least one secondary connecting element 41 forming part of the articulation 36.

The aerodynamic structure 34 comprises a first panel 42 with a first face 42.1 forming the aerodynamic face F34 and a second face 42.2 opposite the first face 42.1, and also a reinforced second panel 44 with a first and a second face 44.1, 44.2, the second face 44.2 being oriented toward the second face 42.2 of the first panel 42, the first and the second panel 42, 44 being connected to one another to form the aerodynamic structure 34.

The first panel 42 is shaped in accordance with a desired aerodynamic profile. It may be flat or slightly curved. This first panel 42 may be metallic or made of composite material.

According to one feature of the invention, the second panel 44 has at least one relief shape 46 that is obtained by stamping, forming at least one rib. When the first and the second panel 42, 44 are connected, the relief shape 46 forms a box-type structure.

The second panel 44 is made from at least one metallic sheet or plate or from a thermoplastic composite material with long fibers having a substantially constant thickness before stamping. The second panel 44 is stamped such that the relief shape 46 is recessed on the second face 44.2, oriented toward the second face 42.2 of the first panel 42, and protrudes from the first face 44.1.

When the second panel 44 is made from metallic material, the second panel 44 is stamped, or embossed, so as to form the relief shape 46. When the second panel 44 is made from thermoplastic composite material, the second panel 44 is stamped so as to form the relief shape 46.

According to one embodiment, the second panel 44 is flat or slightly curved apart from the relief shape(s) 46. Apart from the relief shape(s) 46, the second panel 44 is shaped like the first panel 42. Thus, away from the relief shape(s) 46, the first and the second panel 42, 44 are pressed closely against one another.

According to one embodiment, the first and the second panel 42, 44 are connected to one another by welding, by adhesive bonding, by co-curing or by any other assembly process. By way of example, the first and the second panel 42, 44 are electron-beam welded. When the first and the second panel 42, 44 are connected to one another by welding, the first and the second panel are made from metallic material or from composite material.

The geometry and the arrangement of the relief shapes 46 will be determined depending on the stresses applied to the aerodynamic structure.

According to one configuration, the aerodynamic structure 34 has an approximately rectangular shape and comprises a first and a second longitudinal edge 48.1, 48.2 that are approximately parallel to one another, and also a first and a second lateral edge 50.1, 50.2 that are approximately parallel to one another. During operation, for a movable aerodynamic structure 34, the first longitudinal edge 48.1 is positioned parallel and close to the articulation 36 and the first lateral edge 50.1 is closer to the fuselage 32 than the second lateral edge 50.2 is.

According to one embodiment, the main connecting element 40 is positioned close to the first longitudinal edge 48.1. It is not positioned equidistantly from the first and the second lateral edge 50.1, 50.2 but slightly offset toward the second lateral edge 50.2. The secondary connecting elements 41 are disposed close to the first longitudinal edge 48.1, on either side of the main connecting element 40. According to an embodiment that can be seen in FIGS. 4 and 13 to 16, the movable aerodynamic structure 34 comprises two secondary connecting elements 41 disposed on either side of the main connecting element 40. According to another embodiment that can be seen in FIGS. 5 and 6, the movable aerodynamic structure 34 comprises four secondary connecting elements 41, two on either side of the main connecting element 40.

Each relief shape 46 comprises at least one main cavity 52 having a bottom 54.1 and lateral walls 54.2. According to one configuration, the lateral walls 54.2 of the main cavity 52 describe a square or a rectangle with rounded corners.

Figure 5:
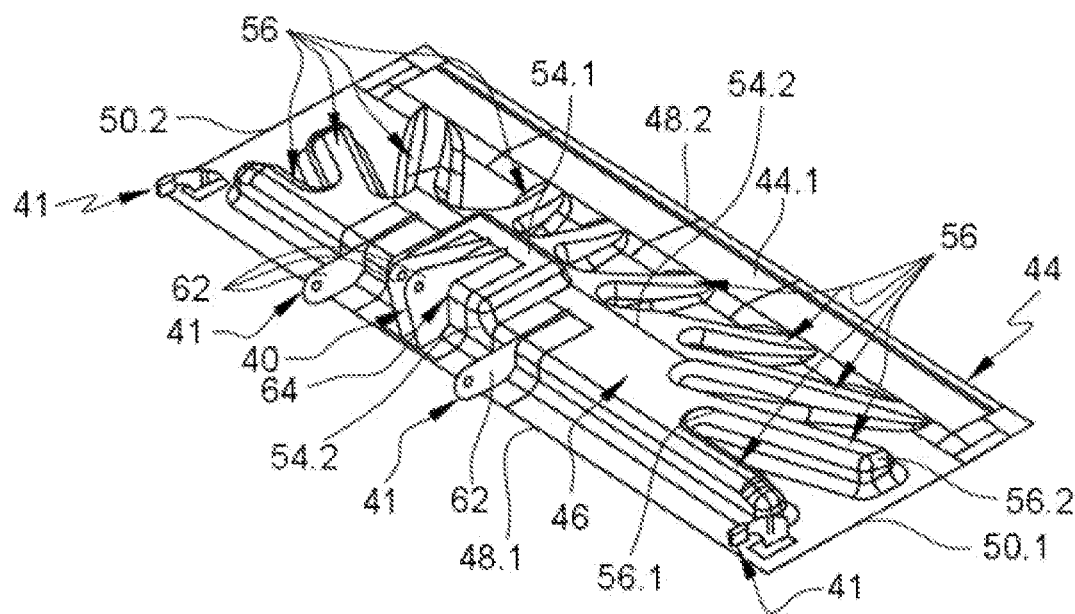
FIG. 5 is a perspective view, from a first viewpoint of a panel of a movable aerodynamic structure illustrating one embodiment of the invention.
Figure 6:
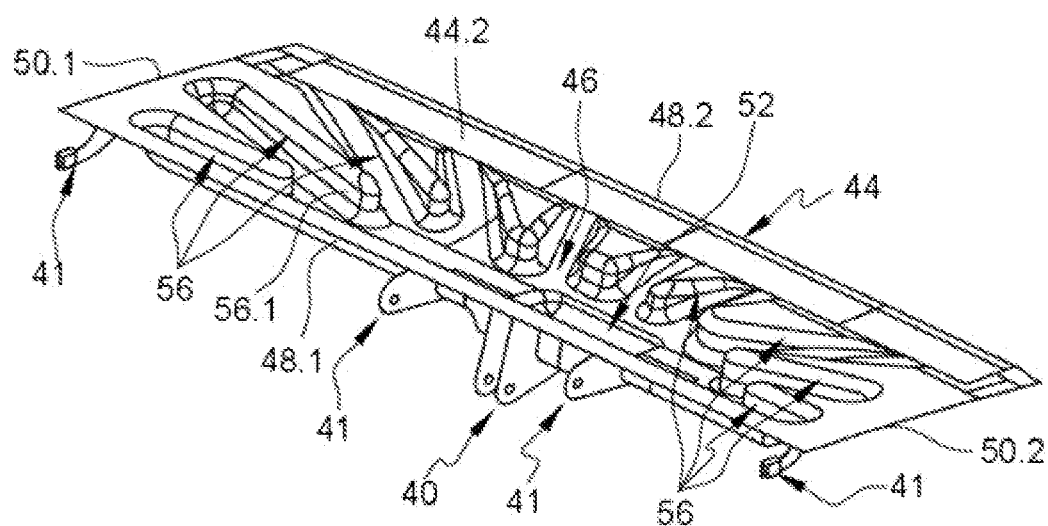
FIG. 6 is a perspective view, from a second viewpoint, of the panel that can be seen in FIG. 5.
Figure 7:
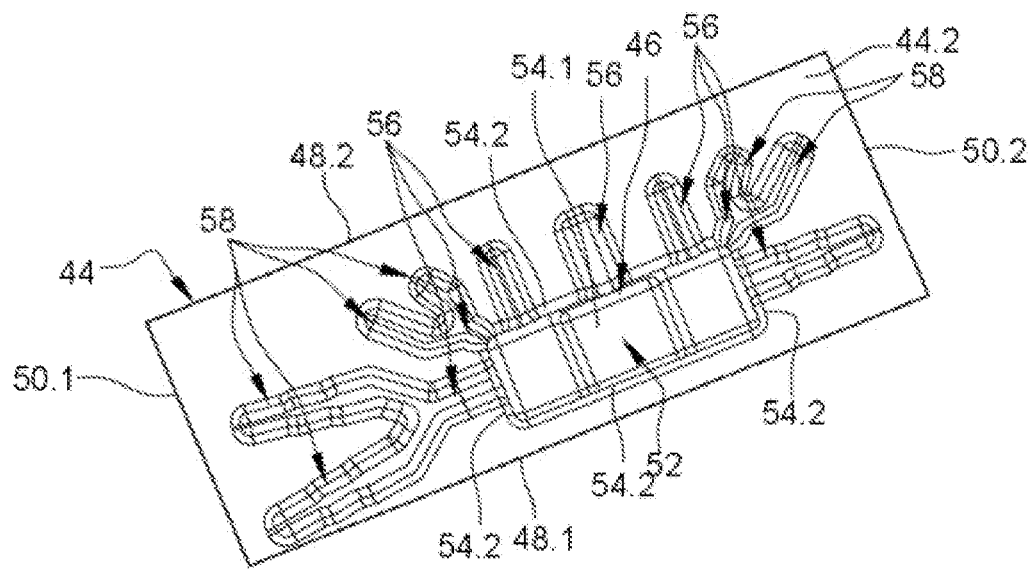
FIG. 7 is a perspective view, from a first viewpoint, of a panel of an aerodynamic structure illustrating another embodiment of the invention.

According to embodiments that can be seen in FIGS. 5 to 7, the main cavity 52 forms a longitudinal rib, approximately parallel to the first longitudinal edge 48.1, which extends over a length that is greater than or equal to at least one third of the length of the aerodynamic structure, the length corresponding to the distance between the first and the second lateral edge 50.1, 50.2.

According to these embodiments, the main connecting element 40 and at least some secondary connecting elements 41 are connected to the main cavity 52.

According to one configuration, the main cavity 52 has a non-constant depth P (distance between the bottom 54.1 and the first panel 42 when it is connected to the second panel 44). In this way, the main cavity 52 has a maximum depth where the main connecting element 40 is installed, this depth decreasing with decreasing distance away from the first and the second lateral edge 50.1, 50.2.

The depth may vary progressively, as is illustrated in FIGS. 5 to 8, or continuously.

According to the embodiments that can be seen in FIGS. 5 to 7, the main cavity 52 has a maximum depth in line with the installation region of the main connecting element 40 and a depth that is less than the maximum depth in line with the installation regions of the secondary connecting elements 41. The main cavity 52 has a width (dimension taken perpendicularly to the first longitudinal edge 48.1) that is constant over its entire length (dimension taken parallel to the first longitudinal edge 48.1). As a variant, the main cavity 52 has a width which changes, this width being at its greatest in line with the installation region of the main connecting element 40 and decreasing with decreasing distance away from the first and the second lateral edge 50.1, 50.2. This change in the width can be done progressively or continuously. As a variant, the main cavity 52 comprises a cross section, specifically a width and/or a depth, which changes progressively or continuously.

Figure 13:
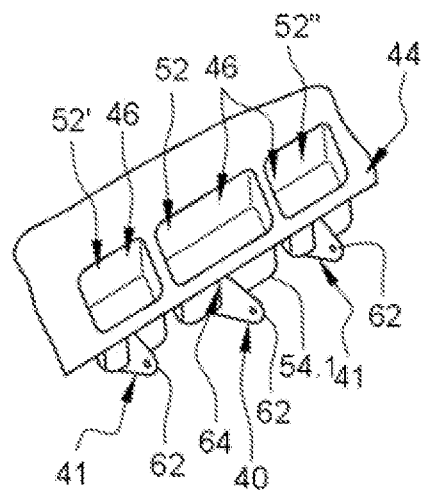
FIG. 13 is a perspective view of a movable aerodynamic structure illustrating another embodiment of the invention.
Figure 14:
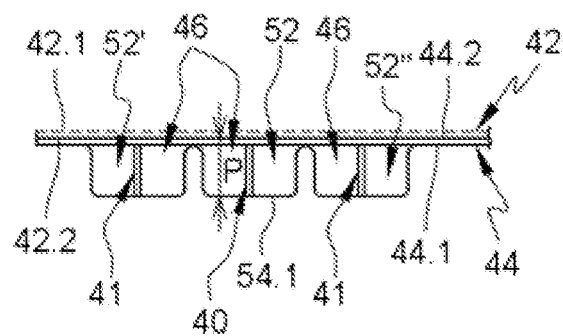
FIG. 14 is a front view of the movable aerodynamic structure that can be seen in FIG. 13.
Figure 15:
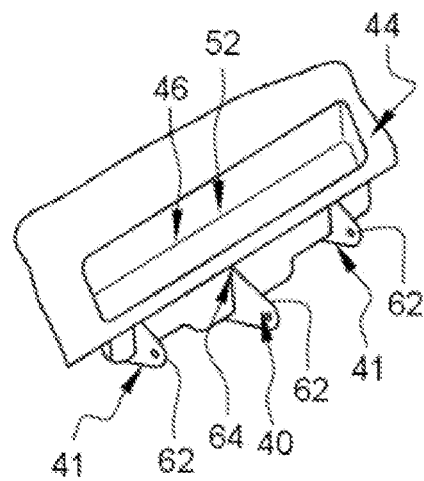
FIG. 15 is a perspective view of a movable aerodynamic structure illustrating another embodiment of the invention.
Figure 16:
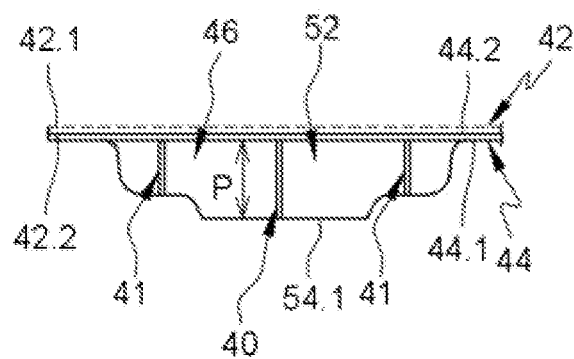
FIG. 16 is a front view of the movable aerodynamic structure that can be seen in FIG. 15.

According to an embodiment that can be seen in FIGS. 13 and 14, the relief shape 46 comprises multiple main cavities: a first main cavity 52 intended for the main connecting element 40, and a second and a third main cavity 52', 52'', which are disposed on either side of the first main cavity 52 and are intended for the secondary connecting elements 41.

In addition to the main cavity (cavities) 52, the relief shape 46 comprises at least one arm 56. According to various configurations, the relief shape 46 comprises multiple arms 56, each extending from a main cavity 52 in the direction of at least one of the first and the second longitudinal edge and the first and the second lateral edge 48.1, 48.2, 50.1, 50.2. Each arm 56 comprises an end remote from the first and the second longitudinal edge and the first and the second lateral edge 48.1, 48.2, 50.1, 50.2.

According to one embodiment that can be seen in FIGS. 5 and 6, the arms 56 are rectilinear. According to an embodiment that can be seen in FIG. 7, at least one arm 56, referred to as main aim, comprises at least one branch and divides into at least two secondary arms 58. At the branch, the secondary arms 58 form an angle of approximately 60° between them.

The arms 56 have arrangements and/or geometries in order that they are distributed approximately uniformly close to each main cavity 52.

Figure 8:
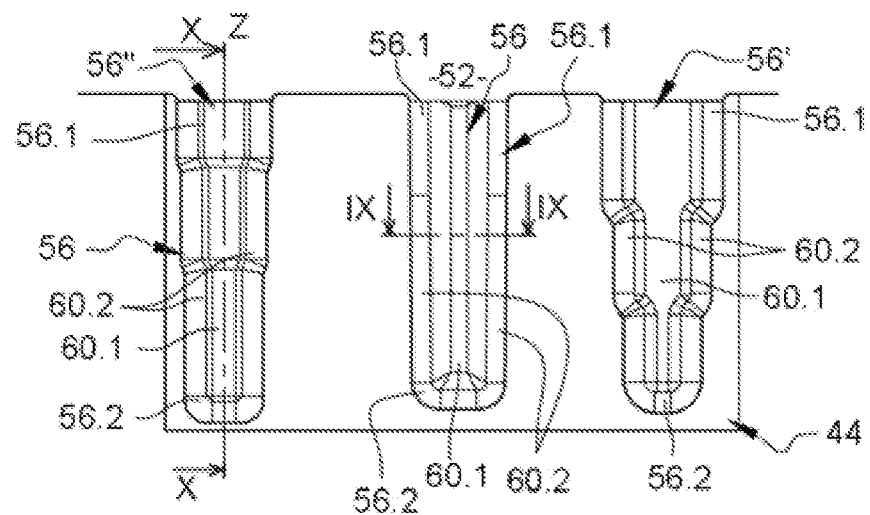
FIG. 8 is a partial top view of a panel of an aerodynamic structure illustrating another embodiment of the invention.
Figure 9:
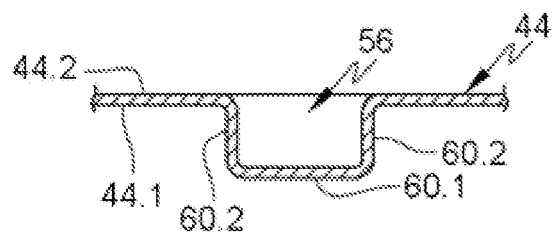
FIG. 9 is a sectional view through the line IX-IX in FIG. 8.
Figure 10:
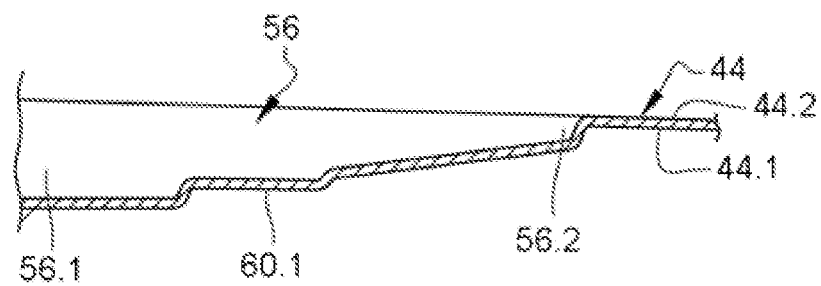
FIG. 10 is a sectional view through the line X-X in FIG. 8.
Figure 11:
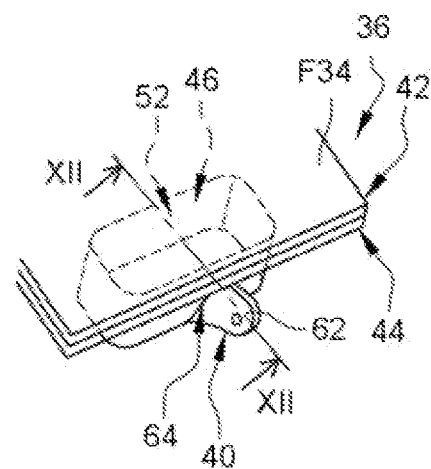
FIG. 11 is a perspective view of a movable aerodynamic structure illustrating one embodiment of the invention.

As is illustrated in detail in FIGS. 8 to 10, each arm 56 comprises a bottom 60.1 and two lateral walls 60.2 delimiting, with the first panel 42 when it is connected to the second panel 44, a cross section S (hatched in FIG. 9).

Each arm 56 has a first end 56.1 that is connected to the main cavity 52 or is closest to the latter and also a second end 56.2 that is furthest away from the main cavity 52.

According to one configuration, each arm 56 comprises a cross section which decreases between the first end 56.1 and the second end 56.2 (along the axis Z shown in FIG. 8). According to an embodiment that can be seen in FIG. 8, a first arm 56 comprises a cross section which gradually decreases continuously from the first end 56.1 to the second end 56.2. As a variant, an arm 56' comprises a cross section which decreases progressively. According to another variant, an arm 56" comprises a cross section which progressively and gradually decreases continuously.

According to one configuration, an arm 56 has a constant width (distance between the lateral walls 60.2) and a depth (distance between the bottom 60.1 and the first panel 42 when it is connected to the second panel 44) which gradually decreases continuously and/or progressively from the first end 56.1 to the second end 56.2.

According to another configuration, an arm 56' has a constant depth and a width which gradually decreases continuously and/or progressively from the first end 56.1 to the second end 56.2.

According to another configuration, an arm 56" has a depth and a width which gradually decrease continuously and/or progressively from the first end 56.1 to the second end 56.2.

According to one embodiment, the progressive reduction of the cross section of the arms 56 or of the main cavities 52 is obtained by virtue of one or more swages (double folding).

According to one configuration, the second panel 44 has a thickness of about 5 mm. The main cavity 52 has a width of about 200 mm and a depth that varies from 30 mm to 100 mm, and, in particular, from 70 mm to 100 mm. The arms 56 are spaced apart from the longitudinal and lateral edges 48.1, 48.2, 50.1, 50.2 by a distance that is greater than or equal to approximately 150 mm They have a width of between 30 mm and 50 mm. The lateral walls 54.2, 60.2 of the main cavity 52 or of the arms 56 are connected to one another, with the bottom 54.1 or with the rest of the second panel 44, by rounded corners having a radius of curvature of about 27 mm.

Each main or secondary connecting element 40, 41 comprises at least one plate 62 having an edge face 64 connected to the movable aerodynamic structure 34.

According to a first embodiment, the edge face 64 is connected to the first panel 42. According to another embodiment, the edge face 64 is connected to the second panel 44 away from the relief shape 46.

According to other embodiments that can be seen in FIGS. 5, 11 to 16, the edge face 64 is connected to the bottom 54.1 and/or to a lateral wall 54.2 of a main cavity 52 and also to the second panel 44 away from the relief shape 46. These embodiments ensure better transmission of forces between the movable aerodynamic structure 34 and the main or the secondary connecting element 40, 41.

Figure 12:
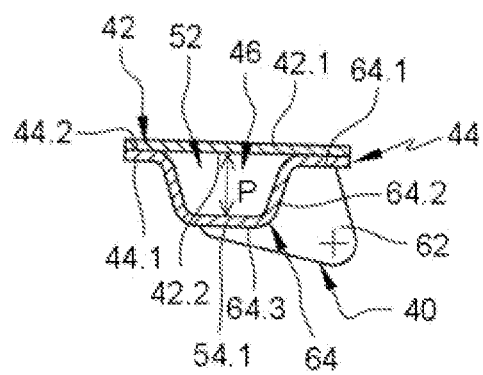
FIG. 12 is a sectional view through the line XII-XII in FIG. 11.

According to a configuration that can be seen in FIG. 12, the edge face 64 has a profile allowing it to closely follow the shape of the second panel 44 in line with a main cavity 52. Thus, the edge face 64 comprises a first section 64.1 in contact with the second panel 44 away from the relief shape 46, a second section 64.2 in contact with the lateral wall 54.2 of the main cavity 52, and a third section 64.3 in contact with the bottom 54.1 of the main cavity 52.

According to one embodiment, the plate 62 of each main or secondary connecting element 40, 41 is connected to the movable aerodynamic structure 34 by welding.

Figure 17:
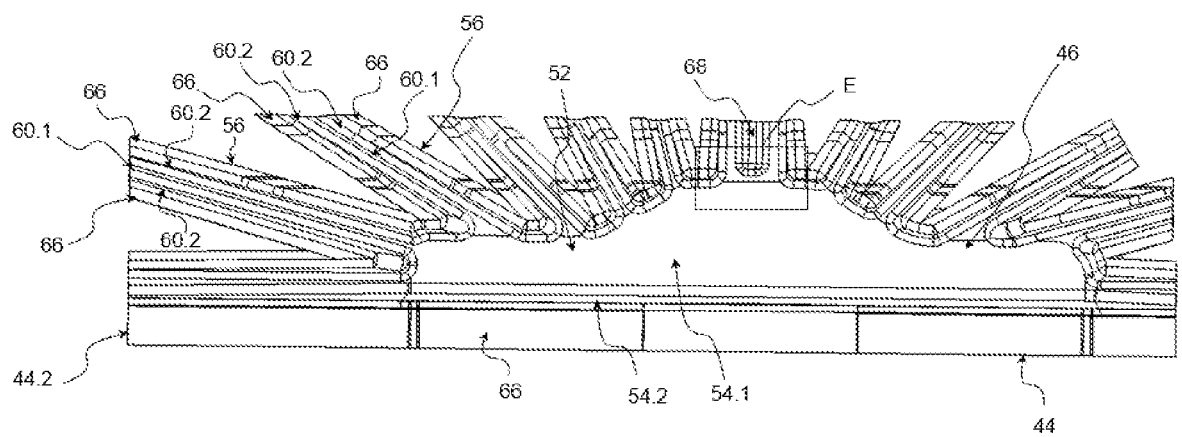
FIG. 17 is a top view of a panel of an aerodynamic structure illustrating one embodiment of the invention.

According to an embodiment shown in FIG. 17, the second panel 44 is constituted solely by the relief shape(s) 46. In other words, the second panel is limited to the relief shape(s) 46.

In FIG. 17, the relief shape 46 has a main cavity 52 and a plurality of main arms 56. Of course, the relief shape 46 could have multiple main cavities 52 and a plurality of main arms 56, and also a plurality of secondary arms 58.

The or each relief shape 46 is partially surrounded by at least one flange 66. More specifically, the main cavity (cavities) 52, each aim 56 and each secondary arm 58 is surrounded by at least one flange 66. The lateral walls 54.2 of the main cavity 52 are arranged obliquely with respect to the bottom 54.1 and with respect to the flange(s) 66. Similarly, the lateral walls 60.2 of the arms 56 are arranged obliquely with respect to the bottom 60.1 and with respect to the flange(s) 66. The lateral walls 54.2, 60.2 may be arranged perpendicularly to the bottom 54.1, 60.1 and to the flanges 66. The lateral walls 54.2, 60.2 connect the bottom 54.1, 60.1, respectively, to the flanges 66.

The flange(s) 66 constitute the second face 44.2 of the second panel 44. The flange(s) 66 are flat or slightly curved. The flange(s) 66 are shaped like the first panel 42. Thus, away from the relief shape(s) 46, the flange(s) 66 of the second panel 44 are pressed closely against the first panel 42.

Figure 18:
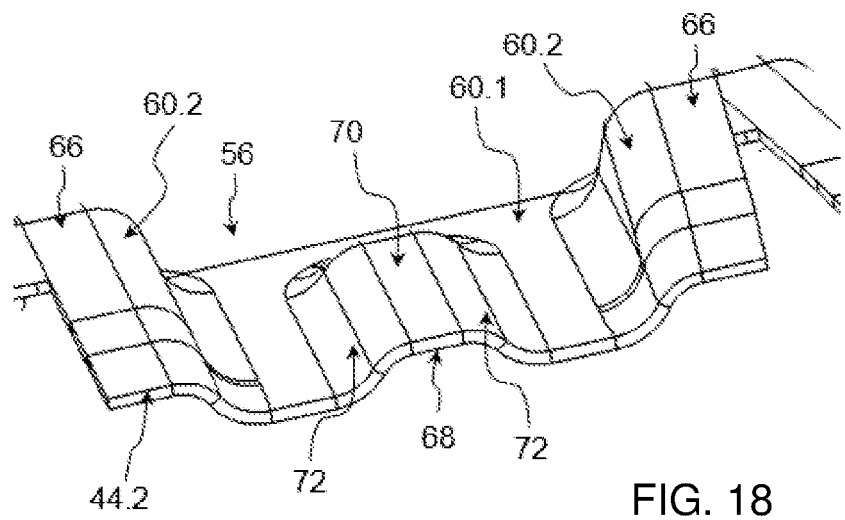
FIG. 18 is an enlarged view of the box E in FIG. 17.

According to an embodiment shown in FIGS. 17 and 18, the second panel 44 comprises at least one reinforcing rib 68 arranged on the bottom 60.1 of an arm 56 of the relief shape 46. Of course, one arm, multiple arms or each arm 56 may comprise such a reinforcing rib 68. Similarly, although this is not shown, the main cavity 52 may comprise at least one such reinforcing rib 68 arranged on its bottom 54.1. Similarly, although this is not shown, one secondary arm, multiple secondary arms or each secondary arm 58 may comprise at least one such reinforcing rib 68 arranged on its bottom. The reinforcing rib 68 makes it possible to stiffen the arm 56 at the bottom of which it is arranged.

The reinforcing rib 68 is rectilinear and extends substantially parallel to the lateral walls 60.2 of the arms 56. The reinforcing rib 68 has a bottom wall 70 and lateral walls 72 which connect the bottom wall 70 to the bottom 60.1. The bottom wall 70 is substantially parallel to the bottom 60.1. The lateral walls 72 are arranged obliquely with respect to the bottom 60.1 and with respect to the bottom wall 70. The reinforcing rib 68 is recessed on the first face 44.1 of the second panel 44 and protrudes from the second face 44.2.

Figure 19:
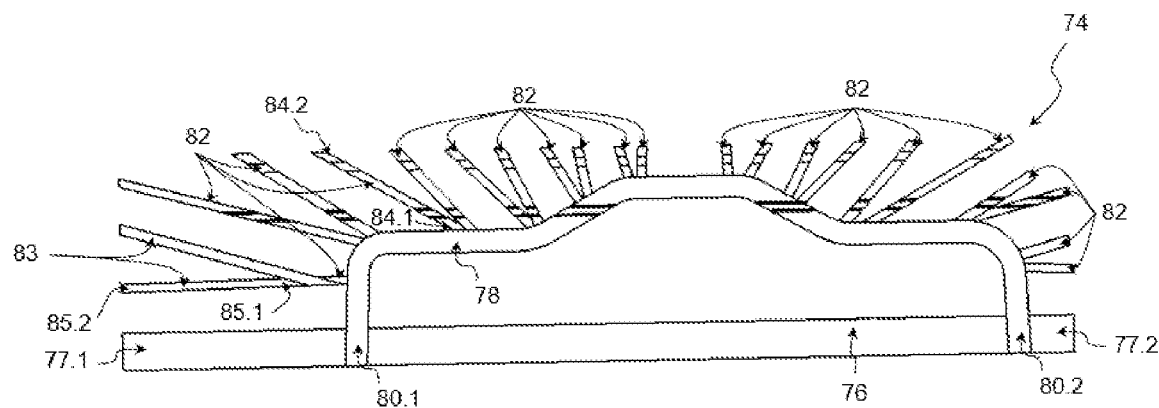
FIG. 19 is a top view of a panel of an aerodynamic structure illustrating one embodiment of the invention.
Figure 20:
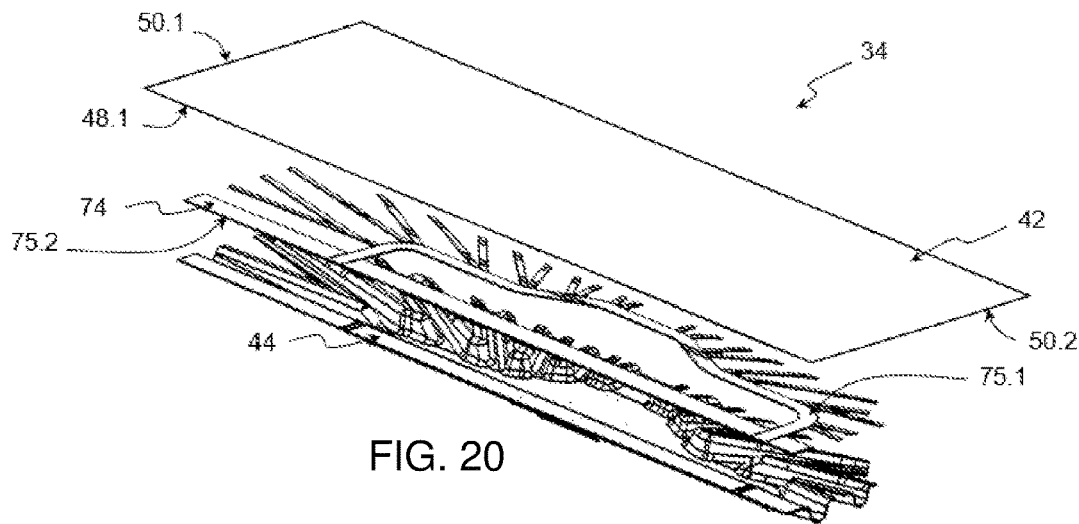
FIG. 20 is a perspective view of an aerodynamic structure illustrating another embodiment of the invention.

According to an embodiment shown in FIGS. 19 and 20, the aerodynamic structure 34 comprises an intermediate panel 74. The intermediate panel 74 is made from metallic material or from composite material. The intermediate panel 74 is made by laying up, or by injection molding, or by cutting out a metallic plate or a plate made from composite material. The intermediate panel 74 is substantially planar. The thickness of the intermediate panel 74 is substantially constant.

As is shown in FIG. 20, the intermediate panel 74 is intended to be arranged between the first panel 42 and the second panel 44. The intermediate panel 74 has a first face 75.1 oriented toward the second face 42.2 of the first panel 42, and a second face 75.2 oriented toward the second face 44.2 of the second panel 44. The intermediate panel 74 constitutes an interface between the first and the second panel 42, 44, in particular at the main connecting elements 40 or secondary connecting elements 41.

The intermediate panel 74 has a first aim 76, which is, for example, rectilinear, which extends longitudinally at the first longitudinal edge 48.1 when the intermediate panel 74 is arranged between the first and the second panel 42, 44. The first arm 76 has a shape substantially identical to the peripheral shape of part of the main cavity 52. The first arm 76 may also be curved. The first arm 76 is remote from the first longitudinal edge 48.1. A first end 77.1 of the first arm 76 is close to the first lateral edge 50.1, and a second end 77.2 of the first arm 76 is close to the second lateral edge 50.2. The first and the second end 77.1, 77.2 are remote from the first and the second lateral edge 50.1, 50.2.

The intermediate panel 74 also has a second arm 78, which has a shape substantially identical to the peripheral shape of part of the main cavity 52. The second arm 78 has rectilinear portions and/or curved portions. The second arm 78 has a first and a second end 80.1, 80.2 that are connected to the first arm 76. The width of the second arm 78 is less than or equal to the width of the first arm 76.

The intermediate panel 74 also has a plurality of third arms 82, each of which having a shape substantially identical to the shape of an arm 56. Each third arm 82 has a first end 84.1 that is connected to the second arm 78 and also a second end 84.2 that is further away from the second arm 78. Each third arm 82 extends from the second arm 78 in the direction of at least one of the first and the second lateral edge and the first and the second longitudinal edge 48.1, 48.2, 50.1, 50.2. The second end 84.2 of each third arm 82 is remote from the first and the second lateral edge and the first and the second longitudinal edge 48.1, 48.2, 50.1, 50.2. As is shown in FIG. 19, the third arms 82 have rectilinear portions. The third arms 82 may also comprise curved portions. The third arms 82 have different lengths (distance between the first and the second end 84.1, 84.2). The width of the third arms 82 is less than or equal to the width of the second arm 78.

The intermediate panel 74 also has a plurality of fourth arms 83, each of which having a shape substantially identical to the shape of a secondary arm 58. Each fourth arm 83 has a first end 85.1 that is connected to the third arm 82 and also a second end 85.2 that is further away from the third arm 82. In particular, a third arm 82 has at least one branch and splits into at least two fourth arms 83. Each fourth arm 83 extends from the third arm 82 in the direction of at least one of the first and the second lateral edge and the first and the second longitudinal edge 48.1, 48.2, 50.1, 50.2. The second end 85.2 of each fourth arm 83 is remote from the first and the second lateral edge and the first and the second longitudinal edge 48.1, 48.2, 50.1, 50.2. As is shown in FIG. 19, the fourth arms 83 have rectilinear portions. The fourth arms 83 may also comprise curved portions. The fourth arms 83 have different lengths. The width of the fourth arms 83 is substantially equal to, or even less than, the width of the third arms 82.

The third and fourth arms 82, 83 have arrangements and/or geometries in order that they are distributed approximately uniformly around the second arm 78.

For each first, second, third and fourth arm 76, 78, 82, 83, the width of the arm is substantially constant over its length. Of course, the width of the arm 76, 78, 82, 83 could vary along the arm, and in particular decrease from its first end 77.1, 80.1, 84.1, 85.1 in the direction of its second end 77.2, 80.2, 84.2, 85.2.

According to one configuration, the intermediate panel 74 has a peripheral shape similar to the peripheral shape of the relief shape 46. In a top view of the second panel 44, the intermediate panel 74 is superposed substantially on the relief shape 46.

According to this configuration, the intermediate panel 74 is inserted between the first and the second panel 42, 44. In this configuration, the second faces 42.2, 44.2 of the first and the second panel 42, 44 are pressed against one another away from the relief shape(s) 46, the intermediate panel 74 being inserted between the first and the second panel 42, 44, at the relief shape(s) 46.

According to another configuration, the intermediate panel 74 has a peripheral shape similar to the peripheral shape of the relief shape 46, including the flanges 66. In a top view of the second panel 44, the intermediate panel 74 is superposed substantially on the relief shape 46 and on the flanges 66. According to this configuration, the intermediate panel 74 is inserted between the first and the second panel 42, 44. In this configuration, the second face 42.2 of the first panel 42 is pressed against the first face 75.1 of the intermediate panel 74 and the second face 44.2 of the second panel 44 is pressed against the second face 75.2 of the intermediate panel 74 away from the relief shape(s) 46 (i.e., at the flanges 66).

Advantageously, an aerodynamic structure 34 comprising an intermediate panel 74 is adapted to different aircraft, or to different locations of one and the same aircraft. In particular, a first aerodynamic structure 34.1 has a first panel 42 having a first aerodynamic surface of a first type, a second panel 44, and an intermediate panel 74 having a first shape; and a second aerodynamic structure 34.2 has a first panel 42 having a first aerodynamic surface of a second type that is different than the first type, a second panel 44 that is identical to the second panel of the first aerodynamic structure 34.1, and an intermediate panel 74 having a second shape that is different than the first shape. In this way, the second panel 44 is generic for different aerodynamic structures 34, and the first panel 42 and the intermediate panel 74 are specific, that is to say adapted depending on the desired aerodynamic surface, and therefore the location of the aerodynamic structure in the aircraft.

Figure 21:
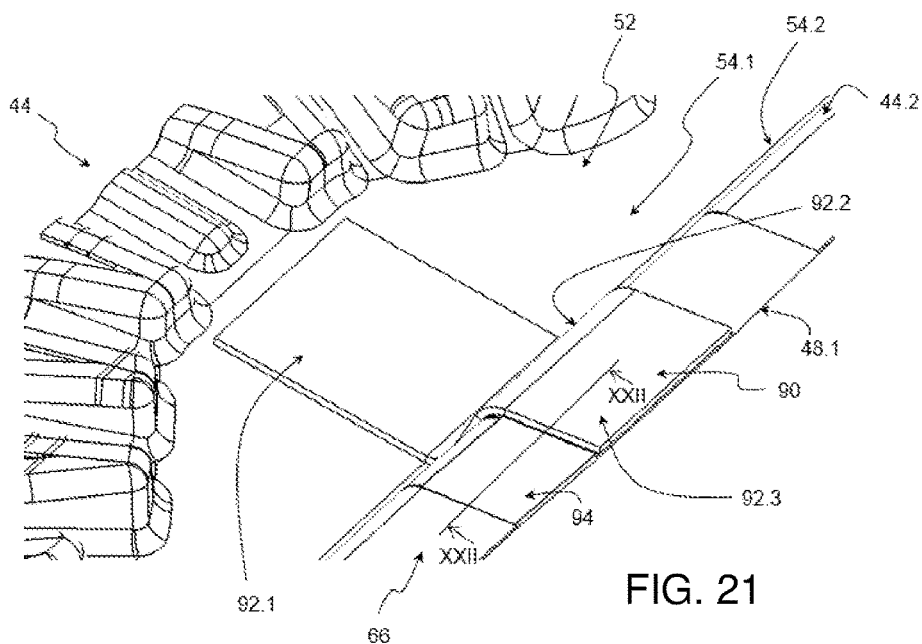
FIG. 21 is a perspective view of a panel of an aerodynamic structure illustrating one embodiment of the invention.
Figure 22:
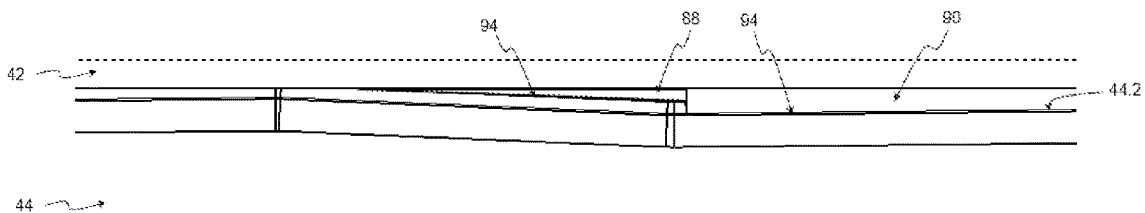
FIG. 22 is a sectional view through the line XXII-XXII in FIG. 21.

According to an embodiment shown in FIGS. 21 and 22, the aerodynamic structure 34 has at least one plate 90 with the overall shape of an S. The plate 90 is a region of increased thickness of the second panel 44, on the second face 44.2. The plate 90 is made from composite material or metal. The plate 90 is welded on the second panel 44. The plate 90 has a substantially constant thickness. The plate 90 has a first section 92.1 extending along part of the bottom 54.1 of the main cavity 52, a second section 92.2 extending along part of a lateral wall 54.2 of the main cavity 52, and a third section 92.3 extending along part of a flange 66 surrounding the main cavity 52. The second section 92.2 connects the first and the third section 92.1, 92.3 together. The first section 92.1 is substantially parallel to the bottom 54.1 of the main cavity 52. The third section 92.3 is substantially parallel to the flange 66 of the main cavity 52.

The second section 92.2 is substantially parallel to the lateral wall 54.2 of the main cavity 52, and is arranged obliquely with respect to the first and the third section 92.1, 92.3.

The second panel 44 has a cavity 94 located on a flange 66 of the main cavity 52, along the longitudinal edge 48.1 of the aerodynamic structure 34. The cavity 94 is located at least facing the location of the third section 92.3 of the plate 90 on the second panel 44, such that when the first and the second panel 42, 44 are assembled to form the aerodynamic structure 34, the third section 92.3 fills at least part of the cavity 94. The plate 90 thus makes it possible to fill the cavity 94 which is defined in the second panel 44, and which remains between the first and the second panel 42, 44 when the aerodynamic structure 34 is being assembled. The plate 90 is disposed inside the aerodynamic structure 34.

The plate 90 is centered in the cavity 94. According to one configuration, for a movable aerodynamic structure 34, the plate 90 and the cavity 94 are arranged at a location corresponding to the location of the main connecting elements 40 or secondary connecting elements 41. In other words, the plate 90 and the cavity 94 are arranged in line with the installation region of the main connecting elements 40 or secondary connecting elements 41. In FIG. 21, the plate 90 is arranged in line with the installation region of the main connecting elements 40. The plate 90 makes it possible to internally reinforce the connection, at the main connecting elements 40 or secondary connecting elements 41.

According to an embodiment shown in FIG. 22, the aerodynamic structure 34 has at least one filler element 88. The filler element is a region of increased thickness of the second panel 44, on the second face 44.2. The filler element 88 is made from a short-fiber thermoplastic composite material. According to one configuration, the filler element 88 is deposited on the second face 44.2 of the second panel 44, and then the composite material constituting the filler element is polymerized. According to another configuration, the filler element 88 is made beforehand, and then is adhesively bonded to the second face 44.2 of the second panel 44. A filler element 88 has a thickness of between 1 and 5 mm, preferably of between 3 and 4.5 mm. The thickness of the filler element 88 varies over the length of the flange 66.

The filler element 88 is arranged at least in part of the cavity 94, in order to fill the cavity 94. In FIG. 22, a filler element 88 is arranged on each side of the plate 90. The depth of the cavity 94 varies with variations in thickness of the filler element 88. The depth of the filler element 88 is greatest in line with the plate 90, and decreases with increasing distance from the plate 90.

As shown in FIG. 22, each filler element 88 is arranged between the second panel 44 and the first panel 42 (shown in dotted lines). A filler element 88 thus makes it possible to fill a cavity 94 which is defined in the second panel 44, and which remains between the first and the second panel 42, 44 when the aerodynamic structure 34 is being assembled.

The filler element(s) 88 and the plate 90 thus make it possible to completely fill the cavity 94 of the second panel 44, which remains between the first and the second panel 42, 44 when the aerodynamic structure 34 is being assembled. The filler element(s) 88 and the plate 90 make it possible for the contact surfaces between the first and the second panel 42, 44 to be continuous.

According to one configuration, for a movable aerodynamic structure 34, each filler element 88 and the cavity 94 are arranged at a location corresponding to the location of the main connecting elements 40 or secondary connecting elements 41. In other words, each filler element 88 and the cavity 94 are arranged in line with the installation region of the main connecting elements 40 or secondary connecting elements 41. In FIG. 22, each filler element 88 is arranged in line with the installation region of the secondary connecting elements 41. The filler elements 88 thus make it possible to internally reinforce the connection, at the main connecting elements 40 or secondary connecting elements 41.

According to a configuration that is not shown, the plate 90 and the filler element 88 are regions of increased thickness on the second face 44.2 of the second panel 44; and the first panel 42 has a cavity. This cavity of the first panel 42 is located facing the location of the third section 92.3 of the plate 90 and the filler element 88 on the second panel 44, such that when the first and the second panel 42, 44 are assembled to form the aerodynamic structure 34, the third section 92.3 and the filler element 88 completely fill the cavity.

According to a configuration that is not shown, when the aerodynamic structure 34 has an intermediate panel 74, the filler element 88 and the plate 90 make it possible to completely fill the cavity 94 of the second panel 44, which is defined between the second panel 44 and the intermediate panel 74 during the assembly of the aerodynamic structure 34.

According to a configuration that is not shown, the plate 90 and the filler element 88 are regions of increased thickness on the second face 44.2 of the second panel 44; and the intermediate panel 74 has a cavity. This cavity of the intermediate panel 74 is located facing the location of the third section 92.3 of the plate 90 and the filler element 88 on the second panel 44, such that when the aerodynamic structure 34 is being assembled, the third section 92.3 and the filler element 88 completely fill the cavity.

Figure 23:
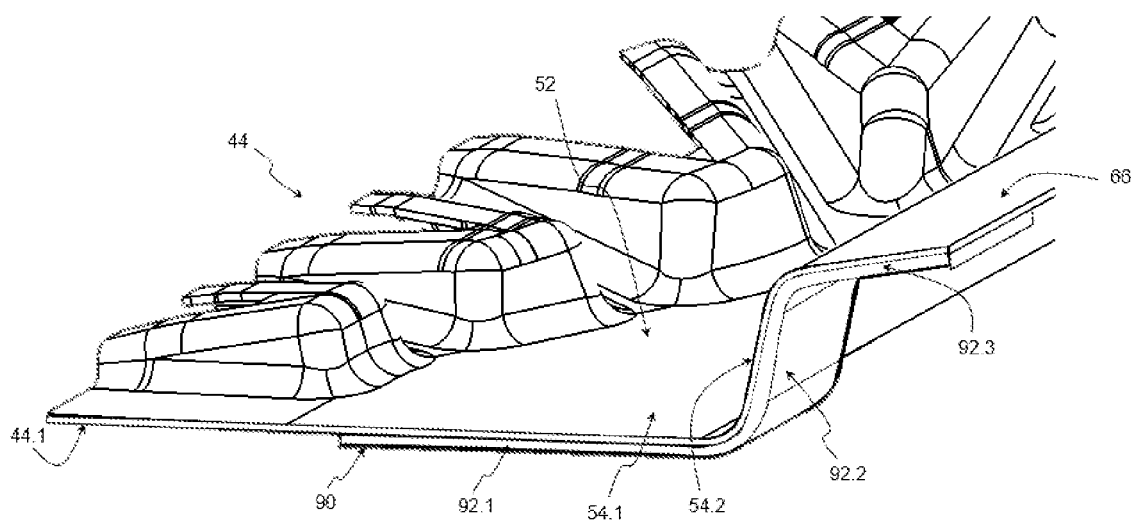
FIG. 23 is a perspective view in section of a panel of an aerodynamic structure illustrating one embodiment of the invention.

According to an embodiment shown in FIG. 23, the plate 90 is a region of increased thickness of the second panel 44, on the first face 44.1. The plate 90 in FIG. 23 is identical to the plate 90 in FIG. 21, but is disposed on the outside of the aerodynamic structure 34. The plate 90 thus makes it possible to externally reinforce the connection, at the main connecting elements 40 or secondary connecting elements 41.

Figure 24:
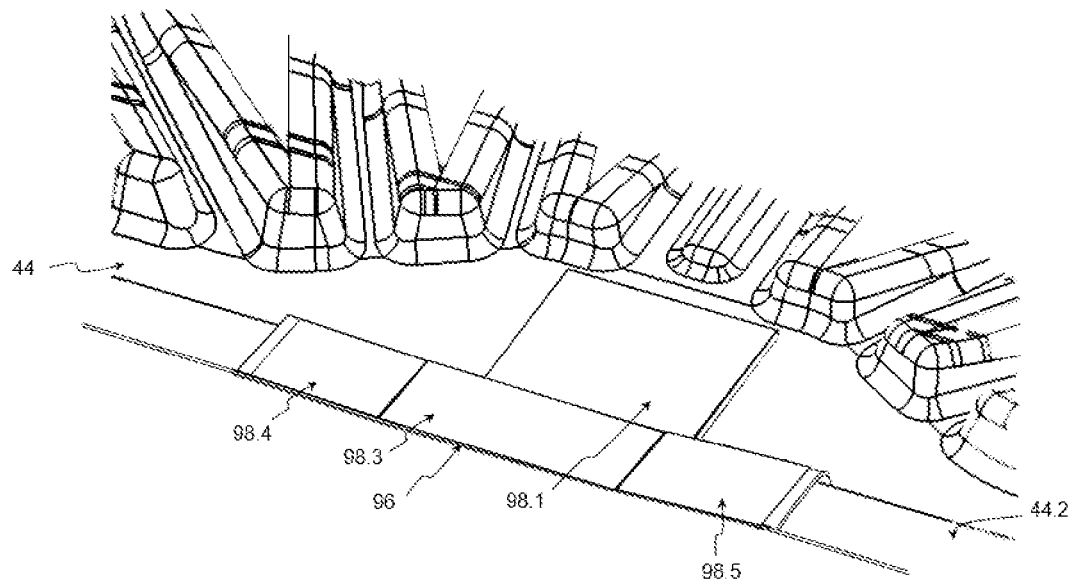
FIG. 24 is a perspective view of a panel of an aerodynamic structure illustrating another embodiment of the invention.

According to an embodiment shown in FIG. 24, the aerodynamic structure 34 has at least one plate 96 with the overall shape of a T. The plate 96 is a region of increased thickness of the second panel 44, on the second face 44.2. The plate 96 is made from composite material or metal. According to one configuration, the plate 96 is welded on the second panel 44. According to another configuration, when the plate 96 is metallic, the plate 96 is conformed to the second panel 44, directly on the second panel 44. According to one configuration, the plate 96 has a constant thickness. According to another configuration, the thickness of the plate 96 varies. The plate 96 has a first section 98.1 extending along part of the bottom 54.1 of the main cavity 52, a second section (not visible in the figures) extending along part of a lateral wall 54.2 of the main cavity 52, a third section 98.3 extending along part of a flange 66 surrounding the main cavity 52, a fourth section 98.4 extends along part of a flange 66 surrounding the main cavity 52 from the third section 98.3 and in the direction of the lateral edge 50.1, and a fifth section 98.5 extends along part of a flange 66 surrounding the main cavity 52 from the third section 98.3 and in the direction of the lateral edge 50.2. The second section connects the first and the third section 98.1, 98.3 together. The first section 98.1 is substantially parallel to the bottom 54.1 of the main cavity 52. The third section 98.3 is substantially parallel to the flange 66 of the main cavity 52. The second section is substantially parallel to the lateral wall 54.2 of the main cavity 52, and is arranged obliquely with respect to the first and the third section 98.1, 98.3. The third section 98.3 connects the fourth and the fifth section 98.4, 98.5 together. The fourth and the fifth section 98.4, 98.5 are substantially parallel to the flange 66 of the main cavity 52.

The cavity 94 of the second panel 44 is located facing the location of the third, the fourth and the fifth section 98.3, 98.4, 98.5 of the plate 96 on the second panel 44, such that when the first and the second panel 42, 44 are assembled to form the aerodynamic structure 34, the third, the fourth and the fifth section 98.3, 98.4, 98.5 fill the cavity 94. The plate 96 thus makes it possible to entirely fill the cavity 94 which is defined in the second panel 44, and which remains between the first and the second panel 42, 44 when the aerodynamic structure 34 is being assembled. The plate 96 is disposed inside the aerodynamic structure 34. The plate 96 thus makes it possible for the contact surfaces between the first and the second panel 42, 44 to be continuous.

The plate 96 and the cavity 94 are arranged at a location corresponding to the location of the main connecting elements 40 or secondary connecting elements 41. In other words, the plate 96 and the cavity 94 are arranged in line with the installation region of the main connecting elements 40 or secondary connecting elements 41. The plate 96 thus makes it possible to internally reinforce the connection, at the main connecting elements 40 or secondary connecting elements 41.

According to a configuration that is not shown, the plate 96 is a region of increased thickness on the second face 44.2 of the second panel 44, and the first panel 42 has a cavity. This cavity of the first panel 42 is located facing the location of the third, the fourth and the fifth section 98.3, 98.4, 98.5 of the plate 96 on the second panel 44, such that when the first and the second panel 42, 44 are assembled to form the aerodynamic structure 34, the third, the fourth and the fifth section 98.3, 98.4, 98.5 entirely fill the cavity.

According to a configuration that is not shown, when the aerodynamic structure 34 has an intermediate panel 74, the plate 96 makes it possible to completely fill the cavity 94 of the second panel 44, which is defined between the second panel 44 and the intermediate panel 74 during the assembly of the aerodynamic structure 34.

According to a configuration that is not shown, the plate 96 is a region of increased thickness on the second face 44.2 of the second panel 44, and the intermediate panel 74 has a cavity. This cavity of the intermediate panel 74 is located facing the location of the third, the fourth and the fifth section 98.3, 98.4, 98.5 of the plate 96 on the second panel 44, such that, during the assembly of the aerodynamic structure 34, the third, the fourth and the fifth section 98.3, 98.4, 98.5 of the plate 96 entirely fill the cavity.

Figure 25:
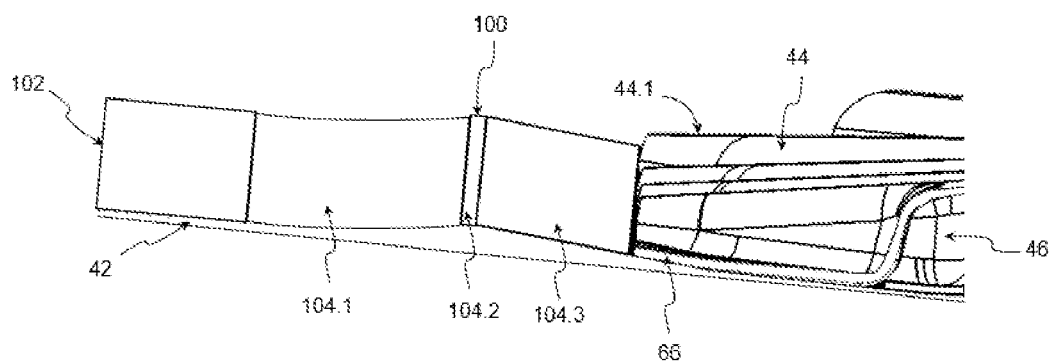
FIG. 25 is a perspective view in section of an aerodynamic structure illustrating one embodiment of the invention.

According to an embodiment shown in FIG. 25, the first panel 42 comprises a region 100 of increased thickness, on its second face 42.2, close to its trailing edge 102. The region 100 of increased thickness is formed in one piece with the first panel 42. The region 100 of increased thickness varies along the first panel 42. In particular, the region 100 of increased thickness has a first portion 104.1 with a thickness increasing from the trailing edge 102 in the direction of the rest of the first panel 42, followed by a second portion 104.2 with a constant thickness, and a third portion 104.3 with a thickness decreasing from the second portion 104.2 in the direction of the rest of the first panel 42.

The ends of the flange(s) 66 of the second panel 44 are curved, so as to be pressed against the region 100 of increased thickness of the first panel 42. The ends of the flange(s) 66 are curved in the direction of the first face 44.1, that is to say in the direction of the relief shapes 46 and in the opposite direction to the region 100 of increased thickness. This adapts, more precisely conforms, the shape of the flanges 66 to the region 100 of increased thickness of the first panel 42, so that the first and the second panel 42, 44 are pressed closely against one another.

The region 100 of increased thickness of the first panel 42 makes it possible to transfer the forces to which the second panel 44 is subjected to the first panel 42, at the trailing edge 102. The curvature of the flange(s) 66 at the end of the second panel 44 makes it possible to incorporate an aerodynamic function into the second panel 44, at the trailing edge 102 of the first panel 42. This is because the region 100 of increased thickness of the first panel 42 and the curvature of the flange(s) 66 of the second panel 44 make it possible to ensure aerodynamic continuity at the trailing edge 102 of the first panel 42.

According to one embodiment, a method for manufacturing an aerodynamic aircraft structure comprises a step of shaping the second panel 44 by stamping so as to obtain the relief shape 46. Before this, the method may comprise a step of shaping the first and the second panel 42 and 44 in the same way depending on a desired aerodynamic profile.

After the shaping of the second panel 44 by stamping, the method comprises a step of joining the first and the second panel 42, 44 by welding, by pressing their second faces 42.2, 44.2 against one another away from the relief shape(s) 46.

According to one embodiment, the method comprises a step of inserting the intermediate panel 74 between the first and the second panel 42, 44, before joining the first and the second panel 42, 44 together.

According to one embodiment, during the joining step, the second face 44.2 of the second panel 44 and the second face 45.2 of the intermediate panel 74 are pressed against one another away from the relief shape(s) 46, and the second face 42.2 of the first panel 42 and the first face 75.1 of the intermediate panel 74 are pressed against one another. The first and the second panel 42, 44 are joined to one another by welding, via the intermediate panel 74.

Lastly, for a movable aerodynamic structure 34, the method comprises a step of fixing at least one connecting element 40, 41 on the second panel 44 by welding, at the relief shape 46, after the step of shaping the second panel 44, before or after the step of joining the first and the second panel 42, 44 to one another.

The method of the invention makes it possible to obtain an aerodynamic structure from a limited number of parts, this tending to reduce the manufacturing time and costs.

The creation of ribs on the second panel 44 by stamping makes it possible to reduce the mass of the aerodynamic structure 34 compared to the prior art with the same mechanical properties.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing an aerodynamic structure having a first panel with a first and a second face, the first face forming an aerodynamic face, and also a reinforced second panel with a first and a second face, the second face of the second panel being oriented toward the second face of the first panel, wherein the manufacturing method comprises;
   shaping the second panel, during which the second panel is stamped to obtain at least one relief shape, which is recessed on the second face, wherein the relief shape comprises at least one main cavity and at least one arm,
   joining the first and the second panel by pressing their second faces against one another away from the at least one relief shape, and
   inserting an intermediate panel between the first and the second panel, the intermediate panel comprising a first and a second face, the first face being oriented toward the second face of the first panel and the second face being oriented toward the second face of the second panel, wherein the intermediate panel comprises at least one arm with a shape substantially identical to a shape of the arm of the relief shape or to a peripheral shape of part of the cavity.

2. The manufacturing method as claimed in claim 1, wherein, during the joining step, the second face of the second panel and the second face of the intermediate panel are pressed against one another away from the relief shape, and the second face of the first panel and the first face of the intermediate panel are pressed against one another.

3. The manufacturing method as claimed in claim 1, wherein, during the joining step, the first and the second panel are connected by welding.

4. The manufacturing method as claimed in claim 1, wherein, after the step of shaping the second panel, the manufacturing method comprises a step of fixing at least one connecting element on the second panel at the relief shape.

5. An aerodynamic structure comprising:
   a first panel with a first and a second face, the first face forming an aerodynamic face, and
   a reinforced second panel with a first and a second face, the second face of the second panel being oriented toward the second face of the first panel, the second panel comprising at least one relief shape, which is recessed on the second face, wherein the relief shape comprises at least one main cavity and at least one arm, the second faces of the first and the second panel being connected to one another away from the at least one relief shape,
   wherein the aerodynamic structure comprises an intermediate panel arranged between the first and the second panel, and wherein the intermediate panel comprises at least one arm with a shape substantially identical to a shape of the arm of the relief shape or to a peripheral shape of part of the cavity.

6. The aerodynamic structure as claimed in claim 5, wherein the aerodynamic structure comprises:
   a first and a second longitudinal edge,
   a first and a second lateral edge, and
   at least one main or secondary connecting element positioned close to the first longitudinal edge
   wherein the at least one main cavity is connected to at least one of the main or secondary connecting elements.

7. The aerodynamic structure as claimed in claim 6, wherein the at least one arm extends in a direction of at least one of the first and the second longitudinal edge and the first and the second lateral edge, from a first end connected to the main cavity to a second end, the second end of each arm being remote from the first and the second longitudinal edge and the first and the second lateral edge.

8. The aerodynamic structure as claimed in claim 7, wherein the main cavity or at least one arm of the relief shape has a reinforcing rib.

9. The aerodynamic structure as claimed in claim 6, wherein the aerodynamic structure has at least one plate arranged between the main or secondary connecting element and the first panel.

10. The aerodynamic structure as claimed in claim 5, wherein the second face of the first panel has a region of increased thickness, and
    wherein the second face of the second panel is conformed to said region of increased thickness.

11. The aerodynamic structure as claimed in claim 6, wherein each connecting element comprises at least one plate having an edge face which closely follows the shape of the second panel in line with a main cavity.

12. The aerodynamic structure as claimed in claim 11, wherein the edge face is connected to the second panel away from the relief shape and also to a bottom and a lateral wall of the main cavity.

13. An aircraft having at least one aerodynamic structure as claimed in claim 8.

14. The manufacturing method as claimed in claim 1, wherein the relief shape is at least partially surrounded by at least one flange.

15. The aerodynamic structure as claimed in claim 5, wherein the relief shape is at least partially surrounded by at least one flange.

16. The manufacturing method as claimed in claim 1, wherein the main cavity or at least one arm of the relief shape has a reinforcing rib.

17. The manufacturing method as claimed in claim 16, wherein the reinforcing rib is disposed within the main cavity or the at least one arm of the relief shape on a bottom of the main cavity or the at least one arm.

18. The aerodynamic structure as claimed in claim 8, wherein the reinforcing rib is disposed within the main cavity or the at least one arm of the relief shape on a bottom of the main cavity or the at least one arm.

* * * * *